(12) United States Patent
Heine

(10) Patent No.: US 6,168,664 B1
(45) Date of Patent: *Jan. 2, 2001

(54) ARRANGEMENT FOR COATING OBJECTS WITH WATER SOLUBLE AND WATER DILUTEABLE COATING MATERIALS

(75) Inventor: Werner Heine, Winnenden (DE)

(73) Assignee: Range und Heine GmbH, Moessingen (DE)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/991,698

(22) Filed: Dec. 16, 1997

(30) Foreign Application Priority Data

Dec. 19, 1996 (DE) .......................... 296 22 072 U

(51) Int. Cl.<sup>7</sup> .................................................. B05C 15/00
(52) U.S. Cl. ...................... 118/326; 118/69; 118/DIG. 7
(58) Field of Search .................................... 118/326, 300, 118/600, 70, 69, DIG. 7; 454/50, 53–55; 55/DIG. 46; 427/398.1, 398.3, 398.4

(56) References Cited

U.S. PATENT DOCUMENTS

| 4,367,787 | 1/1983 | Bradshaw . |
| 4,417,541 | * 11/1983 | Schafer ................................ 118/326 |
| 4,687,686 | * 8/1987 | Stofleth et al. ....................... 118/326 |
| 4,732,784 | * 3/1988 | Laroche et al. .................... 427/398.1 |

FOREIGN PATENT DOCUMENTS

| 41 14 867 A1 | 11/1992 | (DE) . |
| 41 43 025 A1 | 7/1993 | (DE) . |
| 42 25 503 A1 | 2/1994 | (DE) . |
| 195 24 327 A1 | 4/1996 | (DE) . |
| 0 678 335 A2 | 10/1995 | (EP) . |
| 0 741 052 A2 | 11/1996 | (EP) . |

* cited by examiner

Primary Examiner—Laura Edwards
(74) Attorney, Agent, or Firm—Michael J. Striker

(57) ABSTRACT

An arrangement for coating an object with water soluble or water dilutable coating materials during a spraying process, has an elongated collecting wall adjacent the object to be sprayed located in a coating region, a collection member connected to a lower portion of the wall, a unit for at least partially cooling the the wall and the collection member located in the coating region, and at least one air moisturizing unit located in the coating region.

7 Claims, 1 Drawing Sheet

ARRANGEMENT FOR COATING OBJECTS WITH WATER SOLUBLE AND WATER DILUTEABLE COATING MATERIALS

BACKGROUND OF THE INVENTION

The present invention relates to an arrangement for coating objects with water soluble or water dilutable coating materials, in particular in spraying processes with at least one coating region.

Arrangements of the above mentioned general type are known in the art. Such arrangement is utilized for example for spray varnishing, spray enameling, for PTFE coating or for coating with adhesives and the like. During coating of objects in spraying processes there is a main disadvantage that the losses of the coating material are very high. They are caused by a portion of the coating material fog sprayed past the object and can amount to between 30 and 60% of the treating coating material. As a result, the process involves considerable cost and also environmental damage.

For preventing a precipitation of varnish losses identified as an "overspray" on parts of the arrangement, varnishing devices have been proposed in which water-irrigated walls are arranged in the vicinity of the objects to be varnished. Particles of the coating material which heat the walls are taken by the water and collected in collecting troughs. Subsequently, the varnish slurry and the water are separated from one another. The varnish slurry must be then disposed. Other processes in which a partial recovery of the coating material is provided are better. One possibility to provide such a recovery is to use an overspray collecting system. For this purpose, devices for collecting the overspray are arranged around the coating region. The coating material falling on the devices is moisturized and collected in a flowable form. The German patent document DE-OS 41 43 025 also proposes a varnishing method in which the parts of installation in the varnish region are cooled below the dew point of the varnish fog. Thereby, the varnish fog which is sprayed past the objects to be varnished is condensed on the parts of the device and runs down on them. Then it can be caught in a trough and used again after cleaning. Since the dew point of the varnish fog changes in dependence on the surrounding temperature, there is a danger that a drying of the varnish overspray occurs on the parts of the device. Due to the insulating action of the varnish on the separator surface, the surface temperature can increase above the dew point, so that the overspray can dry.

SUMMARY OF THE INVENTION

Accordingly, it is an object of the present invention to provide an arrangement for coating objects, which avoids the disadvantages of the prior art.

More particularly, it is an object of present invention to provide an arrangement for coating objects which makes possible an approximately complete recovery of the coating material in a simple manner.

In keeping with these objects and with others which will become apparent hereinafter, one feature of present invention resides, briefly stated in an arrangement for coating objects with water soluble or water dilutable coating materials, in which arrangement parts located in a coating region are at least partially cooled and at least one air moistening unit is provided in the coating region.

By the cooling of the parts of the arrangement, a condensation of the air moisture is provided, so that the parts of the arrangement are coated with a thin liquid film. During a change of the dew point on the arrangement, for example because of properties of the coating material or the environment, the required moisture is obtained by additional moisturizing units. This reliably prevents the drying of varnish or other coating materials such as enamel or also multi-component materials. The coating materials run down on the parts of the arrangement or wiped by a further device. They can be used again after testing. For multi-component materials, a reaction of the mixed components is delayed, so that also here a pure-grade recovery of the individual components is possible.

In accordance with another feature of the present invention, the parts of the arrangement can be cooled preferably to a constant temperature below the air temperature in the coating region. It is thereby guaranteed that also with different values of the surrounding temperature and air moisture, a condensation of the air moisture is provided on the parts of the arrangement.

In accordance with still another feature of present invention, a control device controls at least an air moisture unit in dependence on the air temperature so that it provides always a moisture in the coating region til the relative air moisture in the coating region prevents drying of the overspray. At high surrounding temperatures, the water component of the coating material remains constant automatically. An evaporation of the water component of the coating material is not possible, since the surrounding air is saturated with moisture.

The temperature of the parts of the arrangement can be also adjustable in dependence on the treating coating materials. In this way, for example, during treatment of multi-component materials, the treatment time can be adjusted. A premature reaction of the components can be reliably prevented.

In accordance with still another feature of the present invention, preferably the parts of the arrangement are also provided with a surface having anti-adhesion properties with respect to the coating material.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
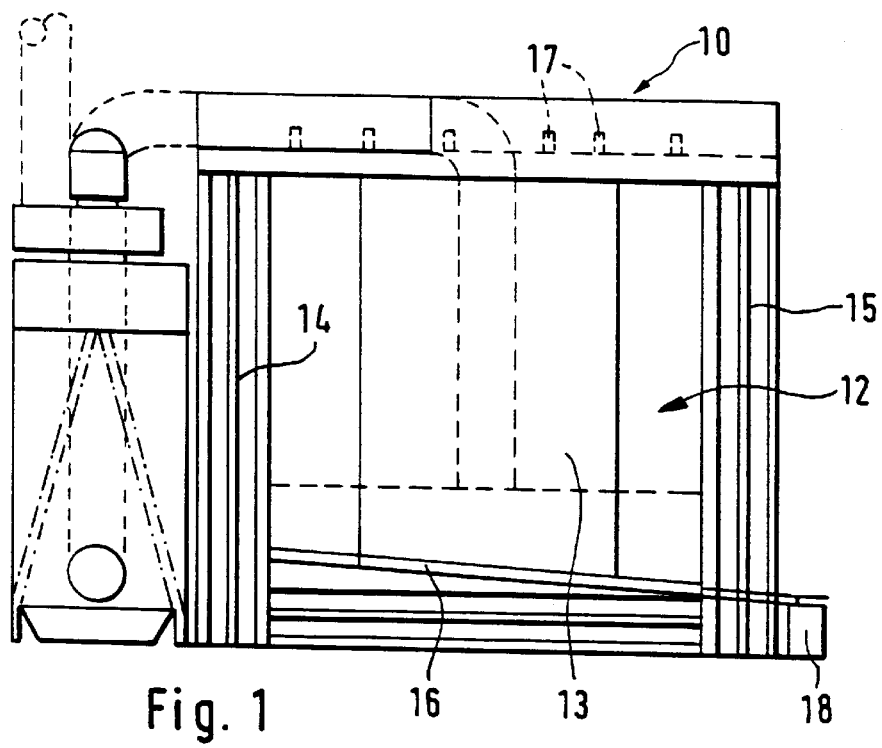
FIG. 1 is a front view of an arrangement for coating objects in accordance with present invention.
Figure 2:
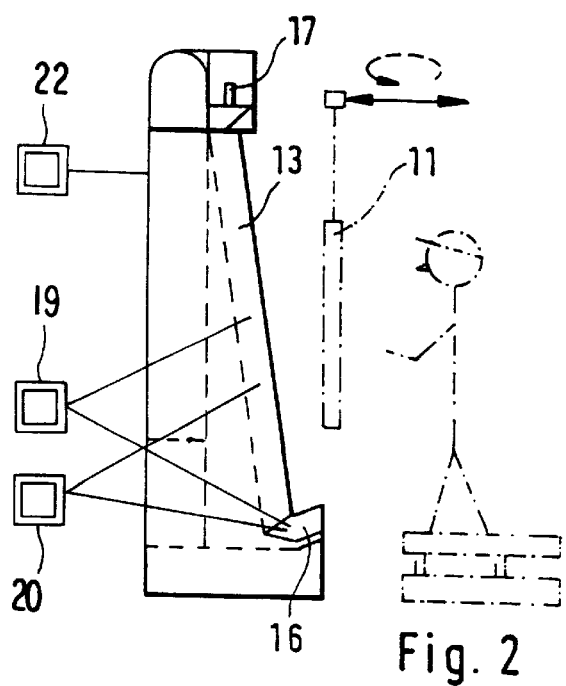
FIG. 2 is a side view of the inventive arrangement of FIG. 1.

An arrangement for coating objects 11 shown in FIG. 2 is identified as a whole with reference numeral 10. The arrangement has a coating region 12 which is limited by a collecting wall 13 and lateral suction elements 14 and 15. The wall 13 at its lower side ends in a collecting trough 16. At least the wall 13, but preferably also the collecting trough 16 with a channel and a discharge are cooled.

Several air moisturizing nozzles 17 are arranged above the coating region 12. The air moisture is condensed under the action of cooling of the parts 13 and 16 of the arrangement in the coating region on the parts 13 by schematically shown known cooling means 19 and 16 and forms on these parts a thin water film. When as shown in FIG. 2, either manually or with a machine, an object 11 is sprayed with a fog of a coating material, then the coating material fog which is spray past the object 11 falls on the parts 13 and 16 of the arrangement which are coated with a thin water film. After reaching a certain layer thickness and overcoming the sheering forces, the material partially flows downwardly.

The downwardly flowing coating material is accumulated in the collecting trough 16 and supplied to a collecting container 18. After testing of the coating material, it can be immediately reused again.

The arrangement 10 in accordance with the present invention is suitable both for varnishing as well as for enameling or coating with multi-component materials. In all cases, a high-grade recovery of the coating materials is possible. The occurring material losses are extraordinarily low. Waste costs for varnish slide drain or the like can be completely eliminated. The coating can be performed either manually or in fully automatic devices with an automatic supply device for the coating material. The cleaning of the arrangement can be performed also automatically.

The arrangement can be provided with means for adjusting a temperature of the parts 13 and 16 in dependence on the coating material, as shown schematically and identified with reference numeral 20 on FIG. 2.

A device 21 for controlling the a moisturizing unit composed of several air moisturizing nozzles 17 can be also provided. The control device controls the moisturizing nozzles so that the latter discharge moisture into the coating region until a relative moisture in the coating region prevents drying of an overspray of the coating material during the spraying process. Finally, a manually operated or a power-operated wiping element 22 can be provided for cleaning the arrangement. Also, the surface of the parts 13 and 16 can have anti-adhesive properties to the coating material. For example, it can be provided with an additional anti-adhesive layer.

It will be understood that each of the elements described above, or two or more together, may also find a useful application in other types of constructions differing from the types described above.

While the invention has been illustrated and described as embodied in arrangement for coating objects with water soluble or water dilutable coating materials, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for coating at least one object with water soluble or water dilutable coating materials during a spraying process, the arrangement comprising an elongated collecting wall disposed adjacent said at least one object to be sprayed in a coating region; a collection member connected to a lower portion of said wall; means for at least partially cooling said wall and said collection member in the coating region in order to enable recycling of overspray material in order to be able to recycle an overspray material; and at least one air moisturizing unit located in the coating region to direct moisture toward said at least one object located in the coating region to prevent drying of the coating materials.

2. An arrangement as defined in claim 1, wherein said means for cooling the wall and collection member is formed so that said means for cooling cools the wall and collection member to a constant temperature below an air temperature in the coating region.

3. An arrangement as defined in claim 1, and further comprising means for adjusting a temperature of the wall and collection member in dependence on the coating materials.

4. An arrangement as defined in claim 1, and further comprising a manually operated wiping element for cleaning the arrangement.

5. An arrangement as defined in claim 1, and further comprising a power-operated wiping element for cleaning the arrangement.

6. An arrangement as defined in claim 1, wherein said wall and collection member have a surface with anti-adhesive properties to the coating materials.

7. An arrangement for coating at least one object with water soluble or water dilutable coating materials during a spraying process, the arrangement comprising an elongated collecting wall disposed adjacent said at least one object to be sprayed in a coating region; a collection member connected to a lower portion of said wall; means for at least partially cooling said wall and said collection member located in the coating region in order to enable recycling of overspray material; at least one air moisturizing unit located in the coating region to direct moisture toward said at least one object located in the coating region and to prevent drying of the coating materials, and a device for controlling said at least one air moisturizing unit so that it discharges moisture into the coating region until a relative moisture in the coating region prevents drying of an overspray of the coating material during the spray process.

* * * * *